US008656465B1

(12) United States Patent
Fong-Jones (10) Patent No.: US 8,656,465 B1
(45) Date of Patent: Feb. 18, 2014

(54) USERSPACE PERMISSIONS SERVICE

(75) Inventor: Zhen Elizabeth Fong-Jones, Somerville, MA (US)

(73) Assignee: Google Inc., Mountain View, CA (US)

( * ) Notice: Subject to any disclaimer, the term of this patent is extended or adjusted under 35 U.S.C. 154(b) by 12 days.

(21) Appl. No.: 13/467,810

(22) Filed: May 9, 2012

Related U.S. Application Data

(60) Provisional application No. 61/483,824, filed on May 9, 2011.

(51) Int. Cl.
*G06F 7/04* (2006.01)

(52) U.S. Cl.
USPC ........ 726/5; 726/4; 726/17; 726/27; 713/165; 713/166; 713/167

(58) Field of Classification Search
USPC .......... 726/2, 4, 5, 6, 27, 16, 17; 713/165–167
See application file for complete search history.

(56) References Cited

U.S. PATENT DOCUMENTS

| | | | |
|---|---|---|---|
| 6,405,317 B1 * | 6/2002 | Flenley et al. | 726/4 |
| 7,506,364 B2 * | 3/2009 | Vayman | 726/4 |
| 7,734,914 B1 * | 6/2010 | Malasky | 713/165 |
| 7,765,594 B1 * | 7/2010 | Bennett et al. | 726/22 |
| 7,802,294 B2 * | 9/2010 | Perlin et al. | 726/9 |
| 7,926,086 B1 * | 4/2011 | Violleau et al. | 726/1 |
| 8,065,741 B1 * | 11/2011 | Coblentz et al. | 726/27 |
| 2003/0084344 A1 * | 5/2003 | Tarquini et al. | 713/201 |
| 2004/0103323 A1 * | 5/2004 | Dominic | 713/202 |
| 2004/0230835 A1 * | 11/2004 | Goldfeder et al. | 713/201 |
| 2005/0154738 A1 * | 7/2005 | Thomas et al. | 707/10 |
| 2006/0048228 A1 * | 3/2006 | Takemori et al. | 726/22 |
| 2006/0070112 A1 * | 3/2006 | LaMacchia et al. | 726/1 |
| 2006/0265489 A1 * | 11/2006 | Moore | 709/223 |
| 2007/0033651 A1 * | 2/2007 | Imanishi | 726/26 |
| 2007/0113270 A1 * | 5/2007 | Kraemer et al. | 726/4 |
| 2008/0250141 A1 * | 10/2008 | McCall et al. | 709/224 |
| 2008/0288330 A1 * | 11/2008 | Hildebrand et al. | 705/10 |
| 2009/0119772 A1 * | 5/2009 | Awad et al. | 726/21 |
| 2009/0221266 A1 * | 9/2009 | Ohta et al. | 455/411 |

(Continued)

OTHER PUBLICATIONS

Android Security, "Selectively Control App's Permissions," retrieved from http://www.droidforums.net/forum/android-forum/74528-android-security-selectively-control-apps-permissions.html, accessed on Jul. 5, 2011, 4 pp.

(Continued)

*Primary Examiner* — Zachary A Davis
*Assistant Examiner* — Joseph Pan
(74) *Attorney, Agent, or Firm* — Shumaker & Sieffert, P.A.

(57) ABSTRACT

In one example, a method includes intercepting, by a first security module, a request from a software application executing on the computing device to access a resource of the computing device. The first security module may include a first group of permissions received from a second security module included in an operating system. The second security module may control access by software applications executing on the computing devices to resources of the computing device based upon permissions granted to the software applications. The method may also include identifying a second group of permissions granted to the software application. The second group of permissions may be a subset of the first group of permissions. The method may also include determining, based upon the first group of permissions, whether the software application is allowed to access the resource. The method may also include controlling access to the resource, based on the determining.

20 Claims, 4 Drawing Sheets

(56) References Cited

U.S. PATENT DOCUMENTS

| | | | | |
|---|---|---|---|---|
| 2009/0325615 | A1* | 12/2009 | McKay et al. | 455/466 |
| 2011/0138174 | A1* | 6/2011 | Aciicmez et al. | 713/165 |
| 2012/0210388 | A1* | 8/2012 | Kolishchak | 726/1 |
| 2012/0246297 | A1* | 9/2012 | Shanker et al. | 709/224 |

OTHER PUBLICATIONS

Android Police, "Looking After All Things Android," Cynogen Mod Adds Support for Revoking App Permissions, retrieved from http://www.androidpolice.com/2011/05/22/cyanogenmod-adds-support-for-revoking-and-faking-app-permissions, accessed on Jul. 5, 2011, 18 pp.

Droidwall, "Android Firewall," retrieved from http://code.google.com/p/droidwall, accessed on Jul. 5, 2011, 2 pp.

Hicks, "New CyanogenMod lets you rule Android App Permissions with an iron fist," retrieved from http://www.engadget.com/2011/05/24/new-cyanogenmod-lets-you-rule-android-app-permissions-with-an-ir, May 24, 2011, 6 pp.

Blogs4Android, "Manage Application Permissions from CM7," retrieved from http://blogs4android.com/2011/05/news/manage-application-permissions-from-cm7, May 28, 2011, 4 pp.

Lutz, "NCSU teases TISSA for Android, a security manager that keeps personal bits private," retrieved from http://mobile.engadget.com/2011/04/19/ncsu-teases-tissa-for-android-a-security-manager-that-keeps-per, Apr. 19, 2011, 4 pp.

All Hatter, "Welcome to the AllHatter Internet Marketing Forums," retrieved from http://allhatter.com/showthread.php/21578-CyanogenMod-Adds-Support-For-Revoking-And-Faking-App-Permissions-on-Android, accessed on Jul. 5, 2011, 2 pp.

Appfence, "Protecting User Data from Android Applications," retrieved from http://appfence.org, accessed on Jul. 5, 2011, 2 pp.

LBE Privacy Guard, "Most Powerful Protection App for Android," retrieved from http://forum.xda-developers.com/showpost.php?p=14035214&postcount=1, May 22, 2011, 2 pp.

Dube, "Monitor Acces & Guard Your Android Privacy With LBE Privacy Guard," http://www.makeuseof.com/tag/monitor-access-guard-android-privacy-lbe-privacy-guard/, Jun. 3, 2011, 7 pp.

Summerson, "[New App] LBE Privacy Guard Is Like Windows' UAC for Rooted Android Devices," retrieved from http://www.androidpolice.com/2011/05/26/new-app-lbe-privacy-guard-is-like-windows-uac-for-rooted-android-devices/, accessed on Jul. 5, 2011, 10 pp.

Sameed, LBE Privacy Guard for Android Monitors Access Requests, Guards Privacy, retrieved from http://www.addictivetips.com/mobile/lbe-privacy-guard-for-android-monitors-access-requests-guards-privacy/, May 28, 2011, 5 pp.

"Adroid App Quick Review," retrieved from http://androidappquickreview.blogspot.com/2011/07/aaqr-lbe-privacy-guard-free.html, Jul. 1, 2011, 2 pp.

Googley Mind, "Android App Permissions and Security," retrieved from http://www.googleymind.com/2011/01/android-app-permissions-and-security.html, Jan. 12, 2011, 2 pp.

Play Mobile, "Permission Monitor: direct visibility on suspicious Android-apps," retrieved from http://www.fetxin.com/2011/06/22/permission-monitor-direct-visibility-on-suspicious-android-apps/, accessed on Jul. 5, 2011, 5 pp.

Constantine, "Custom Android Firmware Gives Users More Control Over Permission," retrieved from http://news.softpedia.com/news/Custom-Android-Firmware-Gives-Users-More-Control-over-Permissions-208340.shtml?utm_source=twitterfeed&utm_rnedium=twitter&utm_campaign=s3cb0t, Jun. 27, 2011, 2 pp.

Rogers, "LBE Privacy Guard Monitors and Controls What Permissions Your Android Apps Have," retrieved from http://lifehacker.com/5807797/lbe-privacy-guard-monitors-and-controls-what-permissions-your-android-apps-have, Jun. 2, 2011, 2 pp.

Whispersystems, "Selective Permissions for Android," retrieved from http://whispersys.com/permissions.html, accessed on Jul. 5, 2011, 2 pp.

* cited by examiner

USERSPACE PERMISSIONS SERVICE

RELATED APPLICATIONS

This application claims the benefit of U.S. Provisional Application No. 61/483,824, filed May 9, 2011, the entire content of which is incorporated herein in its entirety.

TECHNICAL FIELD

This disclosure relates to computer security on computing devices.

BACKGROUND

Computing devices may install and execute one or more applications, some of which may be downloaded from the Internet. In some instances, applications may be malicious and therefore attempt to disrupt operation of a computing device and/or obtain access to private information on the computing device. In other instances, an application may request access to resources that are not required for operation of the application.

SUMMARY

In one example, a method includes sending, by a first security module executing on the computing device, a request for a first group of permissions to a second security module that is included in an operating system executing on the computing device. The second security module may control access by software applications executing on the computing devices to resources of the computing device based upon permissions granted to the software applications. The method may also include receiving, from the second security module and by the first security module, the first group of permissions. The method may also include intercepting, by the first security module a second request from a software application executing on the computing device to access a resource of the computing device. The method may also include identifying, by the first security module, a second group of permissions granted to the software application, wherein the second group of permissions is a subset of the first group of permissions. The method may also include determining, by the first security module and based upon the first group of permissions that the software application is allowed to access the resource. The method may also include, in response to the determining, accessing, by the first security module and using the second group of permissions, the resource. The method may also include providing, by the first security module, access to the resource to the requesting software application.

In one example, a computer-readable storage medium encoded with executable instructions that cause a computing device having one or more processors to perform operations including: intercepting, by a first security module executing on the computing device, a request from a software application executing on the computing device to access a resource of the computing device. The first security module may include a first group of permissions received from a second security module that is included in an operating system executing on the computing device. The second security module may control access by software applications executing on the computing devices to resources of the computing device based upon permissions granted to the software applications. The computer-readable storage medium may be encoded with executable instructions that cause a computing device having one or more processors to perform operations including identifying, by the first security module, a second group of permissions granted to the software application, wherein the second group of permissions is a subset of the first group of permissions. The computer-readable storage medium may be encoded with executable instructions that cause a computing device having one or more processors to perform operations including determining, by the first security module and based upon the first group of permissions, whether the software application is allowed to access the resource. The computer-readable storage medium may be encoded with executable instructions that cause a computing device having one or more processors to perform operations including, based on the determining, controlling access, by the first security module, to the resource.

In one example, a computing device includes one or more processors. The computing device may further include one or more processors; a first module; and a second module. The first module may be configured to intercept a request from a software application executing on the computing device to access a resource of the computing device. The first security module may include a first group of permissions received from a second security module that is included in an operating system executing on the computing device. The second security module may control access by software applications executing on the computing devices to resources of the computing device based upon permissions granted to the software applications. The first module may identify a second group of permissions granted to the software application. The second group of permissions may be a subset of the first group of permissions. The first module may determine, based upon the first group of permissions, whether the software application is allowed to access the resource. The first module may, based on the determining, control access to the resource.

The details of one or more examples are set forth in the accompanying drawings and the description below. Other features, objects, and advantages will be apparent from the description and drawings, and from the claims.

DETAILED DESCRIPTION

In general, this disclosure is directed to techniques for managing application permissions using a userspace service that provides user-specified preferences and blacklist services to evaluate the risk of granting permissions specific resources. Mobile applications have become increasingly popular. In some mobile platforms, applications may request all their permissions upfront, including broad permissions such as "read GPS location at any time" or "communicate with any server on the internet at any time." Reviewing applications for malicious behavior or bugs that can be exploited to create malicious behavior may be difficult, even if manual review is performed. Users may often click yes even when asked for dangerous permissions because they want to use new applications.

Asking users for permissions upfront may be confusing. For example, the user may wish to know why an application requires access to a phone state/identity. In some examples the user may be deterred from using the application by the initial request for permissions. Asking users for too much may also lead to potential for abuse. Users may also be dialog-blind and will ignore that dangerous permissions are being requested in order to try out a popular new application.

Even without malicious intent on the part of the developer, mistakes may occur. Security flaws in legitimate applications may cause "confused deputy" attacks such as an application with "full internet access" being tricked into uploading data to an adversary's servers instead of its own. Users may want privacy and can't easily 'go incognito' without uninstalling programs. In other examples, a user might want to turn off location-aware features/sharing for 10 minutes in order to run a private errand, but while leaving the global positioning system (GPS) functionality accessible to the Navigation application.

Aspects of the present disclosure enable a security client executing in userspace to enforce security on a computing device. Techniques of the present disclosure provided by the security client may include not asking for permissions upfront at application install time. Other examples techniques may include only asking for a minimum set of permissions needed to perform a user's request, so the context is clear. Additional techniques may include providing a reason for a request from a software application so the user can make an informed decision. Providing an easy mechanism to revoke individual permissions without uninstalling the entire application may be another technique. Another technique may include providing visual feedback to the user as to the danger level of a given permission or request.

Aspects of the present disclosure further provide techniques in a userspace application that enable a user and/or computing module to specify granular permissions. Each of the granular permissions may specify whether an application is allowed to access a particular resource. Granular permissions may be an effective mechanism for enforcing security policies on third-party applications. Traditionally, granular permissions have been enforced by the operating system, and any changes to the permissions model were required come from the operating system rather than from services provided by userspace applications. Thus, updates to the conventional permissions model required updates to the operating system. In various instances, certain devices may be updated with the new version of the operating system while other devices continue to execute the older version of the operating system, preventing the other devices from receiving the benefits of the updated operating system.

Techniques of the present disclosure provide security services via a userspace application, thereby allowing the userspace application and corresponding security services to be updated independently of the operating system. In this way, security updates may be applied rapidly to a computing device via the userspace application without, for example, modifying or updating the operating system. Consequently, techniques of the present disclosure improve the security of the computing device, for example, when the operating system is infrequently updated.

In one example, techniques of the present disclosure include a userspace security service that receives permissions from the operating system. The userspace security service may, in turn, delegate one or more of the permissions to a client application requesting permission to access a resource after consulting user-specified preferences, blacklists, whitelists, and/or trusted third-party services to evaluate the risk of allowing the client application permission to access the specific resource. For example, a client application may send messages to the userspace security service to request one or more permissions. The userspace security service may check existing user preferences to determine whether the user has previously authorized the application for the particular resource. If a previous authorization exists, the connection may be created by the userspace service (using the permissions originally granted by the base OS permissions framework) and is passed to the client application.

If no previous authorization exists, the user may be prompted to choose whether to allow the request once or whether to deny the URL request. In some examples, additional checks may be implemented such as checking an API to warn the user if an application is attempting to contact a known domain associated with malware. The user, or parties the user trusts, could maintain lists of known behavior by whitelisted applications to import as sensible defaults in order to limit the amount of user interaction required for initial runs of an application. Other such permissions include access to specific files on the device, access to the user's contact list, etc.

In some examples, an opt-in feature may be included by the userspace security service that provides verification a requested resource, such as a URL, is not included on phishing/malware blacklists via a remote service that provides an Application Programming Interface (API). Techniques of the present disclosure further provide coarse permission control via the userspace security service (e.g. access to specific files on the device, access to the user's contact list, etc.).

In some examples, a userspace security service implementing techniques of the present disclosure uses preloadable whitelists, such as an Access Control List (ACL), which may be generated by trusted third parties. The whitelists may identify commonly used and trusted applications. The userspace security service may use the whitelists to decide whether to trust third party applications to create configurations and/or access resources, thereby simplifying management overhead.

In some examples, techniques are provided to detect if a program is sending users' personal information out using the API. Although the aforementioned examples describe permissions relating to resources such as URLs, contacts, files, and GPS coordinates, techniques of the present disclosure may generally relate to permissions for any resource of a computing device, including hardware and software resources of the computing device. Moreover, any such resources for which permissions are requested may be local resources of a computing device or network resources connected to a computing device.

Figure 1:
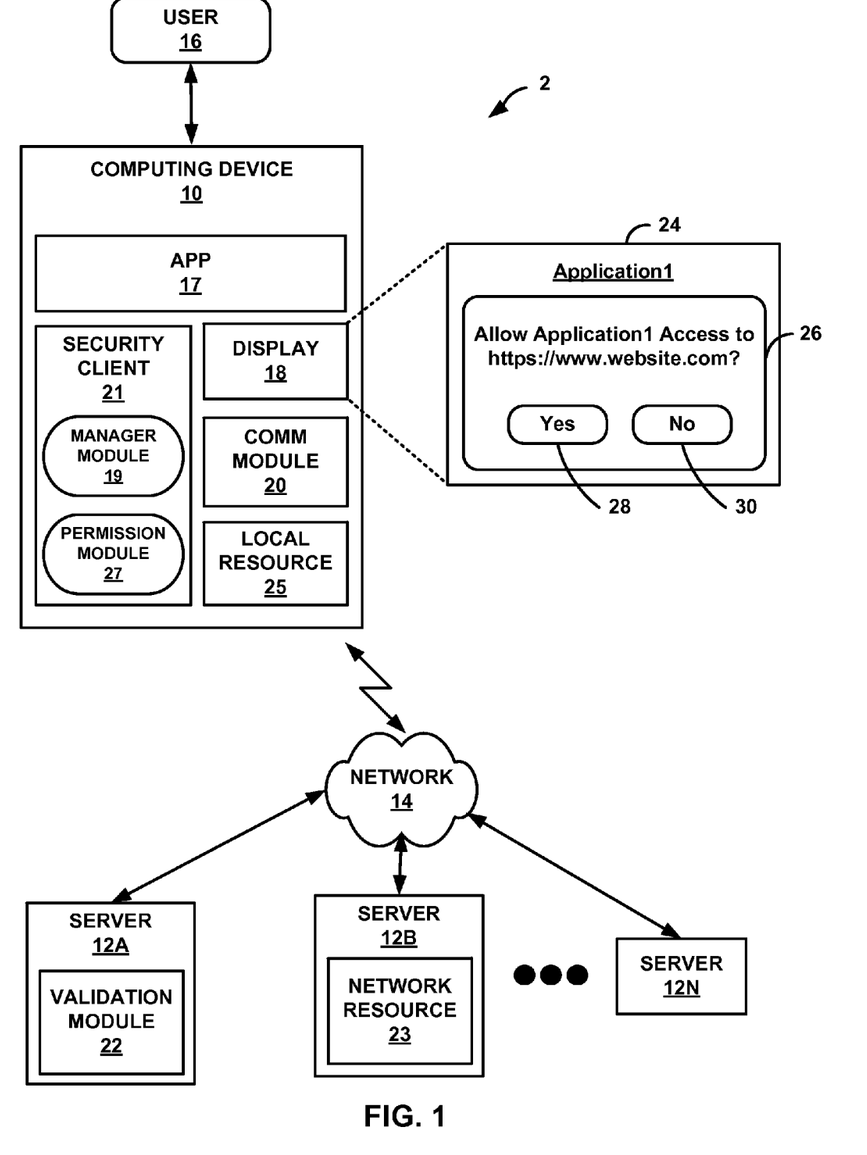
FIG. 1 is a conceptual diagram illustrating an example system to provide a userspace security server, in accordance with one or more aspects of the present disclosure.
Figure 2:
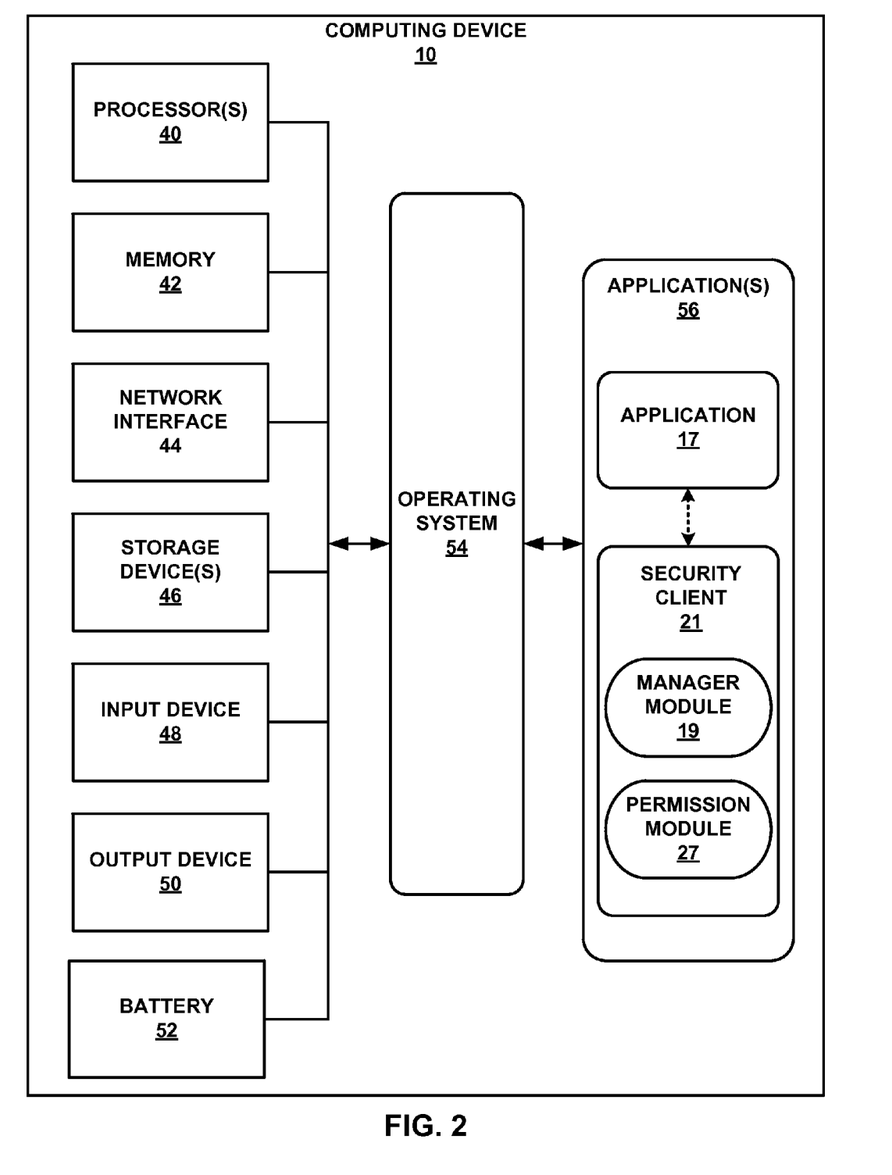
FIG. 2 is a block diagram illustrating further details of one example of the computing device shown in FIG. 1, in accordance with one or more aspects of the present disclosure.

FIG. 1 is a conceptual diagram illustrating an example system to provide a userspace security service, in accordance with one or more aspects of the present disclosure. As shown in FIG. 1, system 2 includes computing device 10, servers 12A-12N (collectively, "servers 12"), and network 14. Examples of computing device 10 include, but are not limited to, portable or mobile devices such as cellular phones, personal digital assistants (PDAs), laptop computers, tablet computers, portable gaming devices, portable media players, e-book readers, watches, as well as non-portable devices such as desktop computers. For purposes of illustration only in this disclosure, computing device 10 is described as a portable or mobile device that a user can carry, but aspects of this disclosure should not be considered limited to portable or mobile devices. FIG. 2 describes an example of computing device 10 that implements techniques of the present disclosure in further detail.

Computing device 10 and servers 12 are coupled to network 14 via wired and/or wireless links. Computing device 10 may send data to or receive data from servers 12 via network 14. Network 14 may include a wide-area network such as the Internet, a local-area network (LAN), an enterprise network, a wireless network, a cellular network, a telephony network, a Metropolitan area network (e.g., Wi-Fi, WAN, or WiMAX), one or more other types of networks, or a combination of two or more different types of networks (e.g., a combination of a cellular network and the Internet). Servers 12 may be any of several different types of network devices. For instance, servers 12 may be conventional web servers, specialized media servers, personal computers operating in a peer-to-peer fashion, or other types of network devices. In some examples, one or more of servers 12 may host an online application store, such as the Android™ Market, that may offer applications for download or purchase to user 16.

Computing device 10 may include a display 18, and a communications module (COMM MODULE) 20. Display 18 may be a liquid crystal display (LCD), e-ink, or other display. Display 18 presents the content of computing device 10 to user 16. For example, display 18 may present a graphical user interface (GUI) of an applications executed on computing device 10 such as a web browser or a video game, content retrieved from servers 12, and other functions that may need to be presented to user 16. As another example, display 18 may be a touch screen or a presence-sensitive device that allows user 16 to interact with computing device 10.

In some examples, any application executed on computing device 10 may require data from one or more of servers 12. Communications module (COMM MODULE) 20 transmits a request for the data and receives the data from one or more of servers 12. Communications module 20 may provide the received data to device 10 for further processing. Communications module 20 is configured to transmit data/requests to and receive data/responses from one or more servers 12 via network 14. Communications module 20 may support wireless or wired communication, and includes appropriate hardware and software to provide wireless or wired communication. For example, communications module 20 may include an antenna, modulators, demodulators, amplifiers, and other circuitry to effectuate communication between computing device 10 and one or more of servers 12.

As shown in FIG. 1, computing device 10 may include a security client 21 that provides a userspace security service as further described herein. Security client 21 may be referred to as a security module. Security client 21 may further include a manager module 19 and permission module 27. Manager module 19, in some examples, manages Access Control Lists (ACLs) and allows user 16 to revoke/modify permissions of applications that attempt to access resources. In addition, manager module 19 may cause display 18 to display a permissions request to user 16 and further store decisions provided by user 16. Permission module 27, in some examples, initially obtains and stores coarse permissions from the operating system. In some examples, the operating system may include a security module that controls access by software applications to resources of the computing device based upon permissions granted to the software applications. Other modules of the operating system may include a process scheduler module, memory management module, etc. In some examples, the "operating system" as described in this disclosure may refer to the security module of the operating system that controls access by software applications to various resources (e.g., network connections, file access, etc.).

Permissions module 27 may hold a set of operating system-level permissions and further use those permissions to make requests for resources on behalf of requesting applications. For instance, permissions module 27 may initially request from the security module of the operating system a set of permissions that include some or all of the permissions provided by the operating system of computing device 10. Permissions module 27 may receive the permissions, which may subsequently be delegated by security client 21 to other applications in response to requests to access various resources.

In one example, user 16 may interact with computing device 10 using one or more input devices (e.g., as shown in FIG. 2) and display 18 to perform various functions. For example, user 16, using one or more input devices, may cause device 10 to execute an application 17 displayed using display 18. In one example, application 17 may request user permissions to access various resources of device 10 and/or network resources accessible to device 10 via network 14.

In accordance with techniques of this disclosure, application 17 may attempt to access network resource 23 provided by server 12B. Application 17 may initially generate a request that may attempt to send to server 12B. When application 17 attempts to send the request to server 12B, security client 21 may intercept the request. Security client 21 may, in some examples, be a standalone application that executes on device 10 as a userspace application.

As previously described, client programs such as application 17 communicate with security client 21 via an API provided by security client 21. To application 17, the API provided by security client 21 may be a native API that takes parameters and returns either results or a token enabling calls to be made on a raw result object. One example of a native API may be a native Android Interface Definition Language (AIDL) API. As further described herein, application 17 sends requests to security client 21, and receives a set of permissions that indicate whether access to the requested resource is allowed or denied. Because the application 17 may use the native API of security client 21, security client 21 may further provide fine-grained permissions. Client programs such as application 17 also may receive 'retry errors' while a user is evaluating a request for permission. 'Retry errors' may signal to a client program that it should retry its request periodically to determine if the user has given an approval or denial of their request.

In some examples, security client 21 may include an API. The API may be similar to or is the same as the operating system and therefore may include one or more system calls provided by the operating system. When application 17 makes a request to access a resource using a system call provided by an API of the operating system, security client 21 may receive the request via the API provided by security client 21. As is described herein, security client 21, upon intercepting the request, may invoke the system call of the operating system on behalf of application 17 if application 17 has permission to access the resource. In such examples, some or all of the functionality provided by security client 21 may be included in one or more libraries that provide the APIs that are similar to or the same as the operating system. Security client 21, another application, and/or a user may cause a dynamic linker of the operating system to load the one or more libraries. In some examples, the dynamic linker may not require superuser or "root level" access to load the one or more libraries. In this way, the APIs in the of security client 21 may override the system calls of the API provided by the operating system to intercept the requests to access resources.

Security client 21 may initially receive the request and identify the requesting application. For example, application 17 may be identifiable by a unique identifier such as an application name or application identifier. Security client 21 may further inspect the request generated by application 17 to identify the requested resource, e.g., network resource 23 of server 12B.

In some examples, security client 21 may access a datastore of previous user authorizations to that specify whether the user has previously authorized an application to access a resource. The datastore may be stored on computing device 10 or on a remote computing device accessible to computing device 10. In the current example, security client 21 may query the datastore to determine if the user previously authorized access to the resource requested by application 17. The datastore may be a database storing a series of different, potentially overlapping ACLs generated by a user, software/hardware component, and/or third-party service. In one example, ACLs may be keyed by exact URL, including protocol, but could be extended to use wildcard matching for more flexibility. In other examples, ACLs may identify other resources such as applications and/or files. In some examples, an ACL for a given URL that expires earliest is applied first in order to allow short-term ACLs to take precedence over long-term ACLs, satisfying the property of being able to grant permissions for minutes only, or to temporarily take away permissions in order to enter a privacy mode that does not store information for a defined session.

If the user has previously authorized access to the requested resource, security client 21 may provide application 17 with permission to access the requested resource. For example, security client 21 may generate set of permissions indicating the previous authorization. Thus, security client 21 may generate the set of permissions based on at least one permission received initially from the operating system and on the request from application 17 for permission to access the requested resource. Security client 21 may apply the generated set of permissions to application 17 thereby allowing or denying access to the requested resource. For instance, in the current example, the set of permissions may be used to control access of application 17 to network resource 23. In some examples, the set of permissions may include data indicating permissions to access a requested resource such as network. In this way, security client 21 provides a userspace security service that provides or denies access to resources requested by applications.

Techniques of the present disclosure may also be applied to applications that attempt to access local resources. For instance, application 17 may attempt to access local resource 25. In such examples, local resource 25 may include any data stored locally on computing device 10. Examples of local resources 25 may include contact information of an address book, electronic mail messages, short or multimedia message service messages, or, more generally, any files stored on computing device 10. If application 17 attempts to access local resource 25, security client 21 may receive the request. Using the aforementioned techniques described in the example of network resource 23, security client 21 may query a datastore of previous authorizations to determine whether application 17 is allowed to access local resource 25. Security client 21 may then allow or deny access to local resource 25 based on the datastore.

In some examples, security client 21 may further use blacklists and/or whitelists to determine whether security client 21 is allowed to access a resource such as local resource 25 and/or network resource 23. A blacklist, generally, may identify one or more untrusted entities that are denied a privilege, service, or access to a resource due to the characteristics of the entity. For example, a blacklist may specify a list of URLs that are malicious or potentially malicious. Consequently, a user may wish to avoid accessing, with computing device 10, any of the specified URLs in the blacklist. Other blacklists may specify applications that are known to be malicious or possibly malicious to computing device 10. A whitelist, in contrast, may identify one or more trusted entities that are provided a privilege, service or access to a resource due to the characteristics of the entity. For instance, a whitelist may specify a list of resources, e.g., URLs and/or applications, which are designated as trusted. Consequently, a user may access entities in the whitelist without concern that the URLs and/or applications are harmful to computing device 10. In some examples, whitelists and/or blacklists may be generated by a trusted third party or the user of computing device 10. Whitelists and/or blacklists may be also be generated automatically by a hardware and/or software module by aggregating information about URLs and/or applications from trusted third-parties. Whitelists and/or blacklists may further be stored locally on computing device 10 or remotely on, e.g., server 12A.

In one example, security client 21 may be configured to check a blacklist. For instance, initially application 17 may request access to network resource 23. Security client 21 may receive the request from application 17 further select the blacklist. If network resource 23 is included in the blacklist, security client 21 may not allow application 17 to access network resource 23. If the blacklist does not include network resource 23, security client 21 may allow access to network resource 23. In an example of a whitelist, if the resource is included in the whitelist, security client 21 may allow access to network resource 23 without requesting the user for authorization, thereby minimizing administration effort by the user. In some examples, security client 21 may enable the user to choose whether or not to automatically allow applications to access resources on a whitelist by selecting one or more user settings.

In some examples, security client 21 may access a remote service to determine whether application 17 is allowed to access local resource 25 and/or network resource 23. The remote service may store previous user authorizations of a user that allowed or denied an application access to a resource. In other examples, the remote service may include a trusted third-party service, which provides up-to-date information about malicious software and/or resources such as URLs. In any case, when security client 21 receives a request from application 17 to access a resource, such as remote resource 23, security client 21 may, upon inspecting the request, generate a message that includes the request and the identifier of application 17. Permission module 19 may send the message to validation module 22 of server 12A. Validation module 22 may provide a remove service to determine whether application 17 is allowed to access network resource 23.

Server 12A may receive the message select the request information included in the message. Using the request information, validation module 22 may determine the identity of the requesting application, e.g., application 17 and the resource requested by the application. In some examples, validation module 22 may query a datastore of previous user authorizations. The datastore may include previous authorizations provided by the user to various resources. In some examples, validation module 22 may further include a third trusted third-party service that indicates whether network resource 23 is malicious or possibly malicious. In the current example, validation module 22 may query the datastore to determine if the user previously authorized access to the resource requested by application 17. If the user has previously authorized such access, validation module 22 may generate a message that includes the data indicating the previous authorization. Validation module 22 may send the message to computing device 10, which may receive the message. Responsive to receiving the message, permission module 19 may provide application 17 with permission to access the requested network resource 23. For instance, permission module 19 may generate a permission response indicating the previous authorization. Permission module 19 may send the permission response to application 17. The permission response may be used to control access of application 17 to network resource 23. In some examples, the permission response may include data indicating permissions to access a requested resource such as network resource 23.

Various aspects of the previous examples may be localized on computing device 10. For example, all or portions of the datastore that include previous user authorizations as previously described may be stored on computing device 10 to improve performance and/or reduce power use by computing device 10. Moreover all or some of the functionality of validation module 22 may be included on computing device 10. In some examples, validation module 22 may query blacklist services or datastores that include data indicating malicious resources or other resources that a user may wish to deny access to. In such examples, validation module 22 may determine whether a request of application 17 includes a requested resource on a blacklist. If yes, the message generated by validation module 22 and sent to computing device 10 may indicate the blacklisted resource. Validation module 22 may deny the request by application 17 based on the message. Although previous user authorizations and blacklists are described in the examples, any other suitable services that provide permission information may be used by the userspace security service provided by validation module 22.

In some examples, the datastore that includes previous user authorizations may not include a previous authorization for the resource requested by application 17. In such examples, permission module 19 may cause display 18 to display a message that indicates no previous authorizations exist in the datastore for the requested resource. The message may be included in graphical user interface 24. User 16 may select YES control button 28 to provide application 17 with permission to access network resource 23 or NO control button 30 to deny access. If the user selects YES control button 28, permission module 19 may allow application 17 access to network resource 23.

In the current example, permission module 19 may further store data indicating authorization in a datastore locally or on, e.g., server 12A. If the user selects NO control button 30 the permission module 19 may deny the request generated by application 17 for network resource 23. Permission module 19 may further store data indicating authorization in a datastore locally or on, e.g., server 12A. In other examples, various different control buttons may be provided by permission 19. For example, permission module 19 may display an "always allow" button that, when selected by a user, allows an application to subsequently access to the requested resource in later requests. In other examples, permission module 19 may display an "allow for five minutes" button that, when selected by the user, allows an application to access the requested resource for a duration of five minutes. Any duration may be used in various different examples. In some examples, "deny always" and "deny for 5 minutes" buttons may similarly be used to deny access.

In some examples, permission module 19 may include functionality to modify and/or revoke pre-existing authorizations or denials provided by a user. For example, a user may provide an initial authorization for an application to access a requested resource. At a later time, the user may wish to deny access to the requested resource. In such examples, permission module 19 may include, for example, a settings page or control panel that displays a requested resource and authorizations or denials associated with the requested resource. The user may send a request to revoke the pre-existing authorization for a requested resource using the control panel. If security client 21 subsequently receives a request to access the resource, security client 21 will deny such access based on the revocation of access to the requested resource.

In other examples, when a resource is requested by an application, permission module 19 may display a first control button that indicates a default action based on the user's previous decision. Permission module 19 may also display a second control button that indicates an action to reverse the default action. For example, if the default action is to allow access to a resource, the action to reverse the default action may be to deny access to the resource. Permission module 19 may also display in the prompt a control that when selected causes permission module 19 to display the settings page.

In some instances, techniques of the present disclosure may only request permissions at the time of an application making a call requiring permission. For instance, when an application is installed, the user may not be asked to specify permissions of the application. However, at a later time, when the application attempts to access a resource, security client 21 may at that time prompt the user to specify permissions for the resource. In some examples, permissions by default may only extend to a single requested resource, such as a URL, but may be expanded by the user to a domain or wildcard. In some examples, the requesting application may not expand the requested resource to a domain or wildcard.

In some examples, techniques of the present disclosure may only present to the user permissions requests when they are needed to perform a user's request. Thus, in some examples, security client 21 may only request the minimum set of permissions required to complete the request of the requesting application. For instance, an application may perform operations that require access to contact information of a user's address book, access to a network connection, and permission to report a GPS location of the computing device. If a user causes the application to request network access and contact information of the user's address book, security client 21 may only prompt user 16 to allow or deny access to these resources. Moreover, because the application has not requested access to report a GPS location of the computing device, security client 21 may not prompt the user for permission to report a GPS location of the computing device. Thus, security client 21 may, in some examples, only request the minimum set of permissions needed to complete the request of the requesting application.

Techniques of the present disclosure may further require applications to submit a justification, rationale, or reason to demonstrate to the user the need for the requested resource. For instance, if an application attempt to request access to a URL, security client 21 may further require that the request include, in addition to an application identifier and the URL, text that specifies a rationale for the request. Security client 21, when prompting the user, may cause display 18 to display the reason thereby informing the user as to why the application is requesting the resource. In this way, security client 21 enables the user to make an informed decision to allow or deny access to the requested resource based on the rationale provided. For instance, if the rationale provided by the application for the request to the resource is inconsistent with the stated purpose and/or functionality of the requesting application, the user may deny such access by the application to the resource.

In some examples, individual requests for resources by applications can be flagged for the user based on their level of riskiness. For instance, an application request to access contacts in a user's address book may be a risker request than allowing the application to create a network connection. In some examples, user 16 may specify levels of risk for respective operations such as network access, file access, etc. User 16's preferences may be stored by security client 21. In other examples, security client 21 may include settings and/or receive information from trusted-third parties that specify the risk level for each operation. One or more associations between risk levels and resources may be stored in a datastore. In this way, access to a particular resource may be associated with a risk level.

When an application attempt to request a resource, security client 21 may determine the risk level for the attempted request and cause computing device 10 to output a risk level indicator of the risk level. For instance, security client 21 may determine the risk level of an attempted request and select, based on the resource requested by an application, the risk level from the one or more associations between risk levels and resources. Security client 21 may subsequently cause display 18 to display a warning that indicates the resource is malicious. The risk level indicator may include moving or still images or text. The moving or still images and/or text may be color-coded such that, for example, green is low risk while red is high risk. More generally, the risk level may be displayed using any color-coding to indicate higher and lower risk operations. Different sets of text and images may also be used by security client 21 to display the level of risk to user 16. Based on the level of risk, user 16 may determine whether or not to allow access to the resource.

In other examples, risk level indicators including sound or haptic feedback may be used to communicate risk levels to a user in a manner similar to the previous example. For instance, security client 21 may, upon determining a risk level of an attempted request, generate sounds having different volume levels and/or audio content that are associated with different risk levels. For instance, a high risk level may be associated with a higher volume sound. Similar techniques may be applied using haptic feedback. For instance, security client 21 may cause a haptic feedback device included in or connected to computing device 10 to provide haptic feedback in response to a risk level. In some examples, the haptic feedback may include a vibration or force generated by the haptic feedback device. The haptic feedback device may generate haptic feedback having different levels of intensity that are associated with different risk levels.

In some examples, security client 21 may further implement techniques that determine if an application may be accessing or transmitting information selected by the user to be monitored by security client 21. In one example, computing device 10 may include a datastore that stores monitored data. Monitored data may include but is not limited to a user's telephone number, email address, and mailing address. When an application, such as application 17, attempts to send data to a remote computing device, security client 21 may perform pattern matching on the data with monitored stored in the data store. For instance, if application 17 attempts to send a phone number, such as 555-555-5555, security client 21 may compare the phone number to the monitored data stored in the data store. If, for example, the monitored data includes data that completely matches or partially matches the phone number, security client 21 may perform one or more operations. For instance, security client 21 may present the data from application 17 from being sent to its intended destination. In other examples, security client 21 may present a notification to the user. Any operation performed in response to a match may be configurable by the user using security client 21.

In some examples, techniques of the present disclosure may provide granular permissions control. For instance, security client 21 may initially receive permissions from an operating system executing on computing device 10. The permissions, generally, may include but are not limited permitting any application to access or modify a file, report a GPS location, or send or receive data via a network connection. Security client 21 may maintain for each application, in a datastore, a set of granular permissions that indicate whether an application is allowed to perform one or more operations with respect to a requested resource. For instance, security client 21 may enable a user to specify that application 17 is allowed to send and receive data via a network connection from a specified URL. Security client 21, may, for a different application, specify that the application is not allowed to access the URL. More generally, each granular permission used by security client 21 may specify an application, a resource, and an operation that the application may or may not perform with respect to the resource. In this way, security client 21 provides granular permissions for each application wishing to perform an operation with respect to a particular resource.

FIG. 2 is a block diagram illustrating further details of one example of computing device 10 shown in FIG. 1, in accordance with one or more aspects of the present disclosure.

FIG. 2 illustrates only one particular example of computing device 10, and many other example embodiments of computing device 10 may be used in other instances.

As shown in the specific example of FIG. 2, computing device 10 includes one or more processors 40, memory 42, a network interface 44, one or more storage devices 46, input device 48, output device 50, and battery 52. Computing device 10 also includes an operating system 54, which may include modules that are executable by computing device 10. Computing device 10, in one example, further includes one or more applications 56, one of which may include application 17. Application 17 may further include permission module 19 and communication module 20. One or more applications 56 may be executable by computing device 10. Each of components 40, 42, 44, 46, 48, 50, 52, 54, and 56 may be interconnected (physically, communicatively, and/or operatively) for inter-component communications.

Processors 40, in one example, are configured to implement functionality and/or process instructions for execution within computing device 10. For example, processors 40 may be capable of processing instructions stored in memory 42 or instructions stored on storage devices 46.

Memory 42, in one example, is configured to store information within computing device 10 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 10 (e.g., one or more of applications 56) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 10, in some examples, also includes a network interface 44. For example, communication module 20 as shown in FIG. 1 may include or be a part of network interface 44. Computing device 10, in one example, utilizes network interface 44 to communicate with external devices via one or more networks, such as one or more wireless networks. Network interface 44 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 10 utilizes network interface 44 to wirelessly communicate with an external device (not shown) such as a server, mobile phone, or other networked computing device.

Computing device 10, in one example, also includes one or more input devices 48. Input device 48, in some examples, is configured to receive input from a user through tactile, audio, or video feedback. Examples of input device 48 include a touch-sensitive and/or a presence-sensitive screen, mouse, a keyboard, a voice responsive system, or any other type of device for detecting a command from a user. In some examples, input device 48 includes a touch-sensitive screen, mouse, keyboard, microphone, or video camera.

One or more output devices 50 may also be included in computing device 10. Output device 50, in some examples, is configured to provide output to a user using tactile, audio, or video stimuli. Output device 50, in one example, includes a touch-sensitive screen, sound card, a video graphics adapter card, or any other type of device for converting a signal into an appropriate form understandable to humans or machines. Additional examples of output device 50 include a speaker, a cathode ray tube (CRT) monitor, a liquid crystal display (LCD), or any other type of device that can generate intelligible output to a user.

Computing device 10, in some examples, include one or more batteries 52, which may be rechargeable and provide power to computing device 10. Battery 52, in some examples, is made from nickel-cadmium, lithium-ion, or other suitable material.

Computing device 10 may include operating system 54. Operating system 54, in some examples, controls the operation of components of computing device 10. For example, operating system 54, in one example, facilitates the interaction of application 58 or identification application 60 with processors 40, memory 42, network interface 44, storage device 46, input device 48, output device 50, battery 52, and short-range communication device 54. Examples of operating system 54 may include Android®, Apple iOS®, Blackberry® OS, Symbian OS®, Linux®, and Microsoft Windows Phone 7®.

As shown in FIG. 2, applications 56 may include application 17 and security client 21. In one example, a user may provide a user input via input device 48 that causes application 17 to attempt to request access to a remote resource specified by a URL. Initially, application 17 may generate a request for the URL and attempt to send the request to access the remote resource. Security client 21 may receive the request via an API as described in FIG. 1. The request may identify application 17 and the requested resource. Upon receiving the request, manager module 19 may initially determine whether the user has provided a previous authorization decision provided by the user with respect to the requested resource. The previous authorization may be stored in an ACL or other datastore that manager module 19 may query based on the identity of application 17 and the requested resource. If the user previously allowed application 17 to access the requested resource, manager module 19 may send a message to permission module 27 that allows application 17 access to the requested resource in the current instance without further prompting the user. As previously described, permission module 27 manages a set of OS level permissions and uses those permissions to make requests on behalf of applications such as application 17.

If no such previous authorization is indicated in the ACL, manager module 19 may cause output device 50 (e.g., display 18) to prompt the user to allow or deny access to the requested resource. The user may provide a corresponding user input via input device 28 to allow or deny access to the resource. If the user allows access to the requested resource, manger module 19 may send a message to permission module 27 that allows application 17 to access the requested resource. Manager module 19 may further update an ACL to indicate the user's preference. If, however, the user denies access to the requested resource, manager module 19 may deny application 17 access to the requested resource and further update an ACL to indicate the user's preference.

As described in FIG. 1, in some examples, security client 21 may also query whitelists, blacklists, and/or trusted-third party services to determine whether an application may access a resource. In such examples, manager module 19 may initially receive a request from application 17 to access a resource. Upon receiving the request, manager module 19 may query sources such as whitelists, blacklists, and/or trusted-third party services that indicate whether application 17 may access the resource. Based on the sources queries, manager module 19 send a message to permission module 27 that allows or denies application 17 access to the requested resource.

Any applications, including applications 58 or identification application 60, implemented within or executed by computing device 10 may be implemented or contained within, executing by, executed by, and/or be operatively/communicatively coupled to components of computing device 10, such as processors 40, memory 42, network interface 44, and/or storage devices 46.

In some examples, security client 21 may execute as one or more processes having a first group of execution privileges. Operating system 54 may execute as one or more processes having a second group of execution privileges that are higher than the first group of privileges. Different execution privilege levels may be defined by operating system 54 to provide varied levels of controls for different operations performed by security client 21, operating system 54, application 17, etc. Consequently, in some examples, security client 21 may request and receive permissions from operating system 54 although security client 21 executes as one or more processes that do not require execution at the elevated execution privileges of operating system 54. Therefore, in some examples, security client 21 may intercept a request from application 17 executing on computing device 10 for permission to access a resource, without the elevated second group of execution privileges of the operating system. Thus, security client 21 may perform techniques of the disclosure without the elevated second group of execution privileges of operating system 54 (e.g., without "rooting" computing device 10 to obtain the elevated second group of execution privileges and/or access to the operating system substructure).

Figure 3:
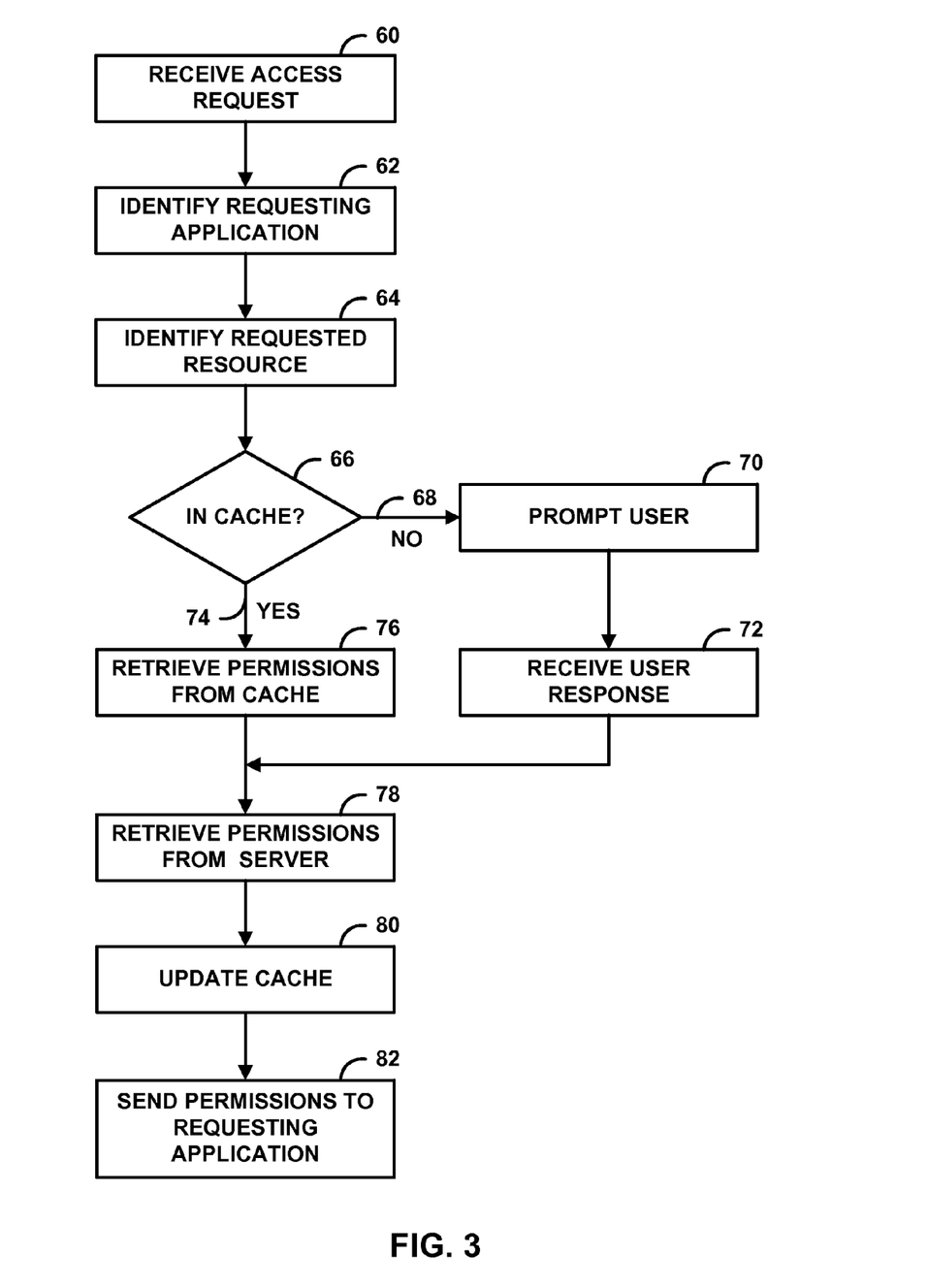
FIG. 3 is a block diagram illustrates one example method of the disclosure that may be performed by security client of a computing device, in accordance with one or more aspects of the present disclosure.

FIG. 3 is a block diagram illustrates one example method of the disclosure that may be performed by security client 21 of computing device 10. For example, security client 21 may receive an access request from application 17 (60) and identify application 17 (62). Security client 21 may further identify the resource requested by the access request (64). In the example method, computing device 10 may query a local cache (66) to determine if the user has provided a previous authorization. If the cache indicates that the user has provided a previous authorization (74), security client 21 retrieves the previous authorization from the cache (76). If the cache indicates the user has not provided a previous authorization (68), security client 21 may prompt the user (70) whether access to the requested resource is allowed and receives a response from the user (72).

Security client 21 may retrieve additional permissions information from a server (e.g., server 12A of FIG. 1) to determine if the requested resource is a malicious resource or if the user previously attempted to access the resource and retrieve (78). When security client 21 has received the relevant permission information, security client 21 may update the local cache of computing device 10 to reflect the most recent permissions information (80). Security client 21 generates a permissions response message based on the permissions information and sends the permissions response message to the requesting application in order to control (e.g., grant or deny) access to the resource by the application (82).

Figure 4:
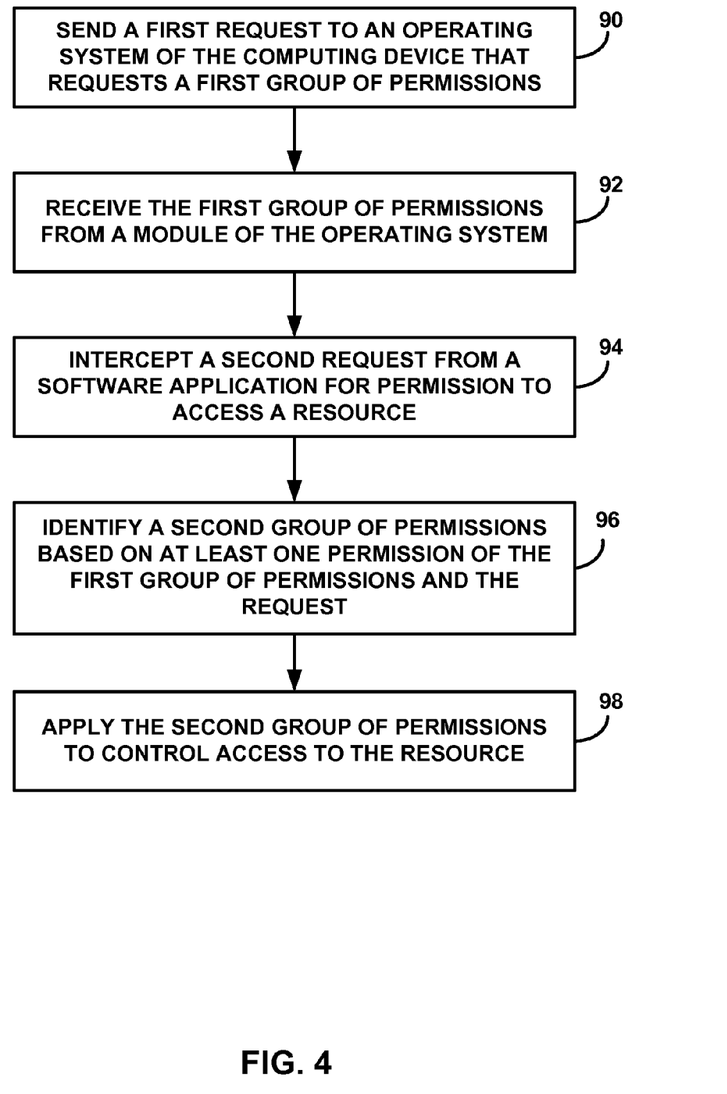
FIG. 4 is a flow diagram illustrating an example method that may be performed by a computing device to manage application permissions using a userspace service, in accordance with one or more aspects of the present disclosure.

FIG. 4 is a flow diagram illustrating an example method that may be performed by a computing device to manage application permissions using a userspace service, in accordance with one or more aspects of the present disclosure. For example, the method illustrated in FIG. 4 may be performed by computing device 10 shown in FIGS. 1 and/or 2.

The method of FIG. 4 includes, sending, by a first security module executing on the computing device, a request for a first group of permissions to a second security module that is included in an operating system executing on the computing device, wherein the second security module controls access by software applications executing on the computing devices to resources of the computing device based upon permissions granted to the software applications (90). The method may further include receiving, from the second security module and by the first security module, the first group of permissions (92). The method may further include intercepting, by the first security module a second request from a software application executing on the computing device to access a resource of the computing device (94). The method may also include identifying, by the first security module, a second group of permissions granted to the software application, wherein the second group of permissions is a subset of the first group of permissions (96).

The method also includes applying, by the security module, the second group of permissions to control access to the resource (98). The method may also include determining, by the first security module and based upon the first group of permissions, that the software application is allowed to access the resource. The method may also include, in response to the determining, accessing, by the first security module and using the second group of permissions, the resource. The method may also include providing access to the resource, by the first security module, to the requesting software application.

In one example, the method may include determining, by the first security module, whether a response from a previous request of the software application for permission to access the resource is included in a datastore that stores previous authorizations to access resources; and if the response from the previous request is included in the datastore, retrieving, by the security module, the response from the datastore. In one example, the may include determining, by the first security module, whether a response from a previous request of the software application for permission to access the resource is included in a datastore that stores previous authorizations to access resources; and if the response from the previous request is included in the datastore, retrieving, by the security module, the response from the datastore.

In one example, the method may include storing, by the first security module, the second response in the datastore. In one example, the method may include receiving, by the first security module, a second response that indicates whether the resource is a malicious resource from data source that indicates whether the resource is malicious, and generating, by the first security module, the second group of permissions based on the second response. In one example, the data source comprises a whitelist, a blacklist, or a remote security service.

In one example, the method may include generating, by the first security module, a warning that indicates the resource is malicious; and displaying, by the computing device, the warning. In one example, the method may include determining, by the first security module, a risk level associated with the resource; generating, by the first security module, one or more risk level indicators associated with the risk level; and outputting with the warning, by the computing device, the risk level indicators associated with the risk level. In one example, the one or more risk level indicators comprise at least one of colors, moving or still images, text, haptic feedback, or a sound.

In one example, the method may include querying, by the computing device, one or more associations between risk levels and resources, wherein the associations are stored in a datastore; and selecting based on the resource, by the computing device, the risk level from the one or more associations between risk levels and resources. In one example, the method may include receiving, by the first security module, a third request from the software application for permission to access the resource; and receiving, by the first security module, an input value that indicates the software application is not permitted to access the resource, wherein the second group of permissions generated by the security module deny the software application access to the resource.

In one example, the method may include determining, by the first security module, whether the software application is authorized to access the resource; and if the software application is authorized to access the resource, authorizing, by the first security module, the software application to access the resource using the second group of permissions. In one example, the method may include receiving, by the first security module, a message that indicates a reason that the software application is requesting permission to access the resource; and displaying, by the computing device, the message.

In one example, the second group of permissions comprises data that indicate whether the software application is allowed to perform one or more operations of a set of operations to access the resource. In one example, the method includes comparing, by the first security module, monitored data stored in a datastore with outbound data that the software application is attempting to send to the resource to determine whether at least part of the monitored data matches the outbound data, and wherein the monitored data is selected by a user for monitoring by the security module; if at least part of the monitored data matches the outbound data, determining, by the first security module, if the software application is allowed to send the outbound data to the resource; and if the software application is not allowed to send the outbound data to the resource, denying, by the first security module, the software application access to send the outbound data. In one example, a resource further comprises a Uniform Resource Locator, application, service, or file. In one example, the datastore may be stored on the computing device. In one example, the datastore may be stored on a remote computing device that is accessible by the computing device.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, other solid state memories, magnetic or optical data storage media, and the like. The techniques additionally, or alternatively, may be realized at least in part by a computer-readable communication medium that carries or communicates code in the form of instructions or data structures and that can be accessed, read, and/or executed by a computer. In some examples, an article of manufacture may comprise one or more computer-readable storage media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in a RAM or cache).

The code or instructions may be software and/or firmware executed by processing circuitry including one or more processors, such as one or more digital signal processors (DSPs), general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments of the disclosure have been described. The following examples provide additional embodiments.

The invention claimed is:

1. A method performed by a computing device having at least one processor, the method comprising:
   sending, by a first security module executing on the computing device, a request for a first group of permissions to a second security module that is included in an operating system executing on the computing device, wherein:
      the first security module is not included in the operating system; and
      the second security module controls access by software applications executing on the computing devices to resources of the computing device based upon permissions granted to the software applications;
   receiving, from the second security module and by the first security module, the first group of permissions;
   intercepting, by the first security module that received the first group of permissions from the second security module included in the operating system, a second request from a software application executing on the computing device to access a resource of the computing device;
   identifying, by the first security module that received the first group of permissions from the second security module included in the operating system, and based at least in part on the second request, a second group of permissions granted to the software application, wherein the second group of permissions is a subset of the first group of permissions;
   determining, by the first security module that received the first group of permissions from the second security module included in the operating system, and based upon the second group of permissions, a previous authorization based on user input indicating that the software application is allowed to access the resource, the user input being received by the computing device prior to the first security module sending the request for the first group of permissions to the second security module, and the user input being responsive to a previous request from the software application to access the resource;
   providing to the software application, by the first security module that received the first group of permissions from the second security module included in the operating system and based on the previous authorization, access to the resource.

2. The method of claim 1, further comprising:
   determining, by the first security module, whether data indicating the previous authorization from the previous request of the software application for permission to access the resource is included in a datastore that stores previous authorizations to access resources; and
   if the data indicating the previous authorization is included in the datastore, retrieving, by the security module, the data indicating the previous authorization from the datastore.

3. The method of claim 2, wherein if the data indicating the previous authorization is not included in the datastore, the method further comprises:
   requesting, by the first security module, a second response that indicates whether the software application is authorized to access the resource;
   receiving, by the first security module, the second response; and
   generating, by the first security module, the second group of permissions based on the second response.

4. The method of claim 3, further comprising:
storing, by the first security module, data indicating the second response in the datastore.

5. The method of claim 1, further comprising:
receiving, by the first security module, a second response that indicates whether the resource is a malicious resource from a data source that indicates whether the resource is malicious, and
generating, by the first security module, the second group of permissions based on the second response.

6. The method of claim 5, wherein the data source comprises a whitelist, a blacklist, or a remote security service.

7. The method of claim 5, wherein if the second response indicates that the resource is malicious, the method further comprises:
generating, by the first security module, a warning that indicates the resource is malicious; and
displaying, by the computing device, the warning.

8. The method of claim 7, further comprising:
determining, by the first security module, a risk level associated with the resource;
generating, by the first security module, one or more risk level indicators associated with the risk level; and
outputting with the warning, by the computing device, the risk level indicators associated with the risk level.

9. The method of claim 8, wherein the one or more risk level indicators comprise at least one of colors, moving or still images, text, haptic feedback, or a sound.

10. The method of claim 8, wherein determining the risk level associated with the resource further comprises:
querying, by the computing device, one or more associations between risk levels and resources, wherein the associations are stored in a datastore; and
selecting based on the resource, by the computing device, the risk level from the one or more associations between risk levels and resources.

11. The method of claim 1, further comprising:
receiving, by the first security module, a third request from the software application for permission to access the resource; and
receiving, by the first security module, an input value that indicates the software application is not permitted to access the resource,
wherein the second group of permissions generated by the security module deny the software application access to the resource.

12. The method of claim 1, further comprising:
determining, by the first security module, whether the software application is authorized to access the resource; and
in response to determining that the software application is authorized to access the resource, authorizing, by the first security module, the software application to access the resource using the second group of permissions.

13. The method of claim 1, further comprising:
receiving, by the first security module, a message that indicates a reason that the software application is requesting permission to access the resource; and
displaying, by the computing device, the message.

14. The method of claim 1, wherein the second group of permissions comprises data that indicate whether the software application is allowed to perform one or more operations of a set of operations to access the resource.

15. The method of claim 1, further comprising:
comparing, by the first security module, monitored data stored in a datastore with outbound data that the software application is attempting to send to the resource to determine whether at least part of the monitored data matches the outbound data, and wherein the monitored data is selected based on a second indication of user input for monitoring by the security module;
in response to determining that at least part of the monitored data matches the outbound data, determining, by the first security module, whether the software application is allowed to send the outbound data to the resource; and
in response to determining that the software application is not allowed to send the outbound data to the resource, denying, by the first security module, the software application access to send the outbound data.

16. The method of claim 1, wherein a resource further comprises a Uniform Resource Locator, application, service, or file.

17. The method of claim 2, wherein the datastore is stored on the computing device.

18. The method of claim 2, wherein the datastore is stored on a remote computing device that is accessible by the computing device.

19. A non-transitory computer-readable storage medium encoded with executable instructions that cause a computing device having one or more processors to perform operations comprising:
intercepting, by a first security module executing on the computing device, a request from a software application executing on the computing device to access a resource of the computing device, wherein the first security module includes a first group of permissions received from a second security module that is included in an operating system executing on the computing device, wherein the second security module controls access by software applications executing on the computing devices to resources of the computing device based upon permissions granted to the software applications, wherein the first security module is not included in the operating system;
identifying, by the first security module that received the first group of permissions from the second security module included in the operating system, and based at least in part on a second request, a second group of permissions granted to the software application, wherein the second group of permissions is a subset of the first group of permissions;
determining, by the first security module that received the first group of permissions from the second security module included in the operating system, and based upon the second group of permissions, a previous authorization based on user input indicating that the software application is allowed to access the resource, the user input being received by the computing device prior to the first security module sending the request for the first group of permissions to the second security module, and the user input being responsive to a previous request from the software application to access the resource; and
based on the determining, controlling access, by the first security module, to the resource.

20. A computing device, comprising:
one or more processors;
a first security module;
a second security module; and
wherein the first module is configured to:
intercept, by the first security module, a request from a software application executing on the computing device to access a resource of the computing device, wherein the first security module includes a first group of permissions received from the second security module that is included in an operating system executing on the computing device, wherein the second security module controls access by software applications executing on the computing devices to resources of the computing device based upon permissions granted to the software applications, wherein the first security module is not included in the operating system;

identify, by the first security module that received the first group of permissions from the second security module included in the operating system, based at least in part on a second request, a second group of permissions granted to the software application, wherein the second group of permissions is a subset of the first group of permissions;

determine, by the first security module that received the first group of permissions from the second security module included in the operating system, and based upon the second group of permissions, the resource, a previous authorization based on user input indicating that the software application is allowed to access the resource, the user input being received by the computing device prior to the first security module sending the request for the first group of permissions to the second security module, and the user input being responsive to a previous request from the software application to access the resource; and based on the determining, control access to the resource.

* * * * *